United States Patent [19]
Ko

[11] Patent Number: 5,826,615
[45] Date of Patent: Oct. 27, 1998

[54] WALL TYPE COMBINATION FAUCET STRUCTURE

[75] Inventor: Hsi-Chia Ko, Changhua Hsien, Taiwan

[73] Assignee: Chung Cheng Faucet Co., Ltd., Taipei, Taiwan

[21] Appl. No.: 752,523

[22] Filed: Nov. 20, 1996

[51] Int. Cl.[6] .................................................. F16K 11/085
[52] U.S. Cl. .................................... 137/454.6; 137/625.41
[58] Field of Search .......................... 137/98, 100, 454.6, 137/625.41, 315

[56] References Cited

U.S. PATENT DOCUMENTS

| | | | |
|---|---|---|---|
| 5,467,799 | 11/1995 | Buccicone et al. | 137/625.41 |
| 5,501,244 | 3/1996 | Shahriar | 137/98 |
| 5,505,225 | 4/1996 | Niakan | 137/625.41 X |

*Primary Examiner*—Stephen M. Hepperle
*Attorney, Agent, or Firm*—Bacon & Thomas

[57] ABSTRACT

A wall type combination faucet structure in which a balancer is located and prevented from being displaced so as to avoid leakage at adjoining portion between the balancer and the faucet body. The adjoining portions between the open end of the faucet body and the cold and hot water inlets are forcedly sealed to achieve a good leakproof effect. The handle can be rotated within 0 degree to 135 degrees to accurately adjust the necessary water temperature. The thread sleeve can be screwed into or out of the cavity to a certain extent so as to shade the exposed clearance between the handle knob and the large decorative cap and achieve a good appearance of the faucet body as well as retain and balance the handle knob.

1 Claim, 4 Drawing Sheets

WALL TYPE COMBINATION FAUCET STRUCTURE

BACKGROUND OF THE INVENTION

The present invention relates to a wall type combination faucet structure in which a balancer is located and prevented from being displaced so as to avoid leakage at adjoining portion between the balancer and the faucet body. The adjoining portions between the open end of the faucet body and the cold and hot water inlets are forcedly sealed to achieve a good leakproof effect. The handle can be rotated within 0 degree to 135 degrees to accurately adjust the necessary water temperature. The thread sleeve can be screwed into or out of the cavity to a certain extent so as to shade the exposed clearance between the handle knob and the large decorative cap and achieve a good appearance of the faucet body as well as retain and balance the handle knob.

SUMMARY OF THE INVENTION

It is therefore a primary object of the present invention to provide a wall type combination faucet structure in which the cold water inlet column and hot water inlet column of the balancer are respectively inserted into the cold water inlet and hot water inlet of the faucet body, whereby the balancer is located and prevented from being displaced so as to avoid leakage at the adjoining portion between the balancer and the faucet body.

It is a further object of the present invention to provide the above combination faucet structure in which the water sealing ring inserted in the annular groove of the cover member can reliably abut against the open end edge of the faucet body and the annular flange can abut against the balancer to further abut against the water sealing rings of the cold and hot water inlet columns around the cold and hot water inlets. Therefore, the adjoining portions are forcedly sealed to achieve a good leakproof effect.

It is still a further object of the present invention to provide the above combination faucet structure in which the handle can be rotated within 0 degree to 135 degrees to accurately adjust the necessary water temperature so as to avoid the problem that the angle range can be hardly controlled.

It is still a further object of the present invention to provide the above combination faucet structure in which in the case that the cavity of the wall is too deep or insufficiently deep, the thread sleeve can be screwed into or out of the cavity to a certain extent so as to shade the exposed clearance between the handle knob and the large decorative cap and achieve a good appearance of the faucet body as well as retain and balance the handle knob.

The present invention can be best understood through the following description and accompanying drawings, wherein:

DETAILED DESCRIPTION OF THE PREFERRED EMBODIMENT

Figure 1:
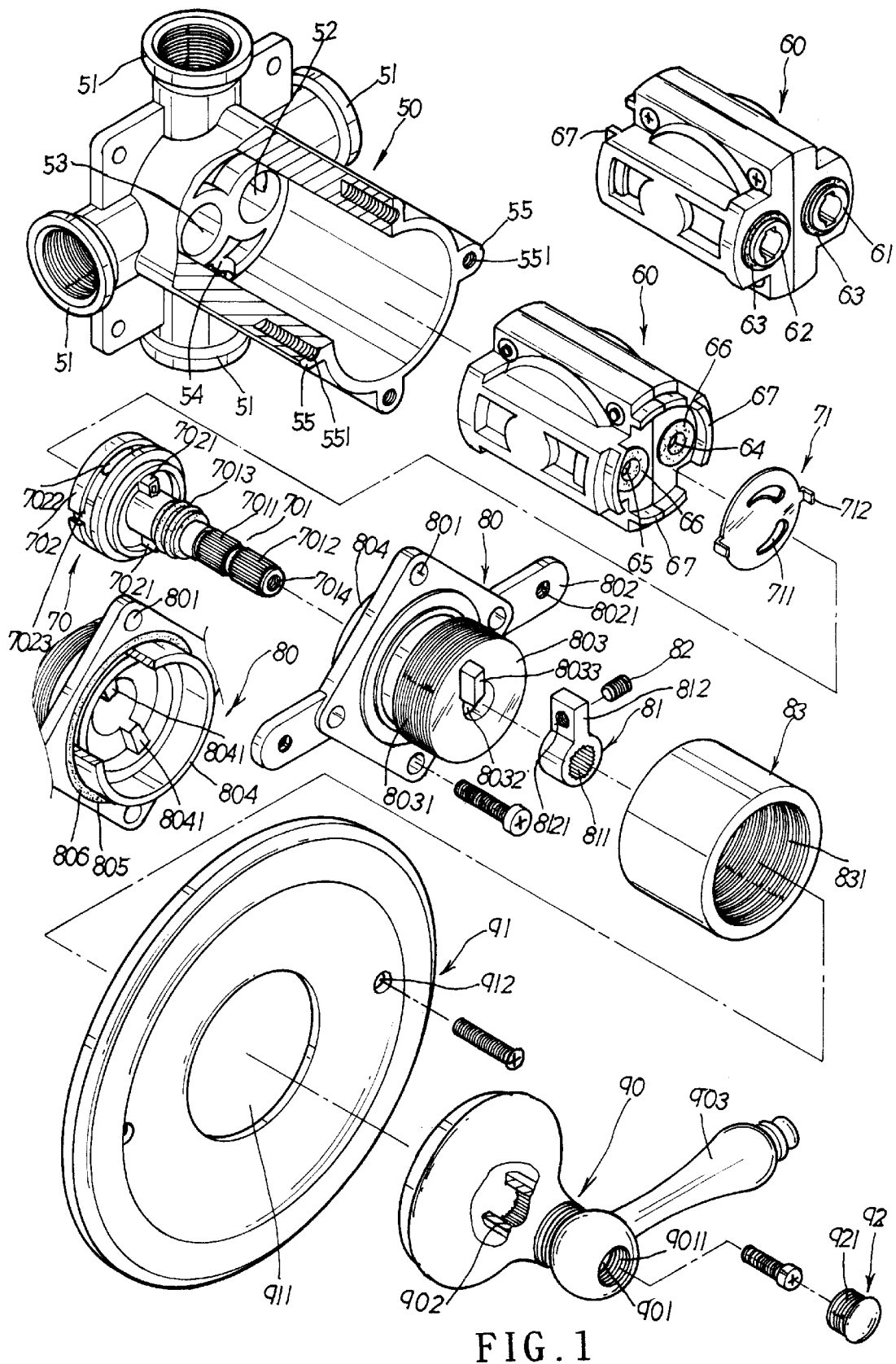
FIG. 1 is a perspective exploded view of the present invention.

Please refer to FIG. 1. The present invention includes a faucet body 50, a balancer 60, a controlling valve 70, a water inlet plate 71, a cover member 80, a temperature setting sleeve 81, an adjustment bolt 82, a thread sleeve 83, a handle knob 90, a large decorative cap 91 and a small decorative cap 92. The upper, lower, left and right sides of rear end of the faucet body 50 are respectively disposed with four pipe lines 51. The bottom of the interior is disposed with a small diameter cold water inlet 52 and a large diameter hot water inlet 53. A water outlet 54 is disposed on lower side between the cold and hot water inlets 52, 53. In addition, the upper, lower, left and right sides of the faucet body 50 are respectively disposed with four locking columns 55 each of which is formed with a thread hole 551. The balancer 60 has a cross-like pattern. The rear end thereof is disposed with a small diameter cold water inlet column 61 and a large diameter hot water inlet column 62 each having an annular groove along outer periphery in which a water sealing ring 63 is inserted. The front end thereof is disposed with a cold water outlet 64 and a hot water outlet 65. A water sealing pad 66 is disposed on outer periphery of each of the cold and hot water outlet 64, 65. Four sides of the front end near the edges are respectively disposed with four arch projecting walls 67. The middle and front sections of the valve stem 701 of the controlling valve 70 is disposed with two fitting sections 7011, 7012 formed with multiple axial restricting ribs 7011, 7012. A pair of water sealing rings 7013 are fitted around the rear section of the valve stem. The head section of the valve stem 701 is disposed with a thread socket 7014. The rear end of the valve stem 701 is connected with a cold/hot combination chamber 702 the top face of which is disposed with two opposite restricting blocks 7021. Two opposite slots 7022 are formed on the periphery of the chamber 702. Two opposite notches 7023 are formed on rear end of the valve stem 701. The end face of the water inlet plate 71 is disposed with two opposite banana-shaped water inlets 711. The periphery of the water inlet plate is disposed with two opposite latch legs 712. The upper, lower, left and right ends of the cover member 80 are respectively disposed four through holes 801. The left and right ends of the cover member 80 are respectively disposed with two locking plates 802 each of which is formed with a thread hole 8021. The front end of the cover member 80 is disposed with a large locking column 803 formed with outer thread 8031 and a central hole 8032. An engaging block 8033 is disposed beside the through hole 8032. An annular flange 804 is disposed on rear end of the cover member 80 and an annular groove 805 is disposed along the outer periphery of the flange 804. A water sealing ring 806 is fitted in the annular groove 805. A large, a middle and a small diameter stepped socket is disposed in the flange 804. Two opposite projecting blocks 8041 are disposed on the face of the middle diameter step. The temperature setting sleeve 81 is formed with a central fitting hole 811 the inner wall of which is formed with multiple restricting ribs. A temperature setting projection 812 extends from the periphery of the sleeve 81. The projection 812 is formed with a thread hole 8121 on lateral side. The thread sleeve 83 has two open ends and the inner diameter thereof is substantially equal to that of the large locking column 803. The thread sleeve is formed with inner thread 831. The head section of the handle knob 90 is formed with a stepped hole 901. The front section of the large diameter step of the stepped hole 901 is formed with inner thread 9011 and the rear end is disposed with a fitting column 902 the inner wall of which is formed with multiple restricting ribs. A handle 903 extends from lateral side of the head section. The large decorative cap 91 is formed with a central hole 911 and two through holes 912 on two sides thereof. The small decorative cap 92 is disposed with a hollow thread rod 921 extending from rear end thereof.

Figure 2:
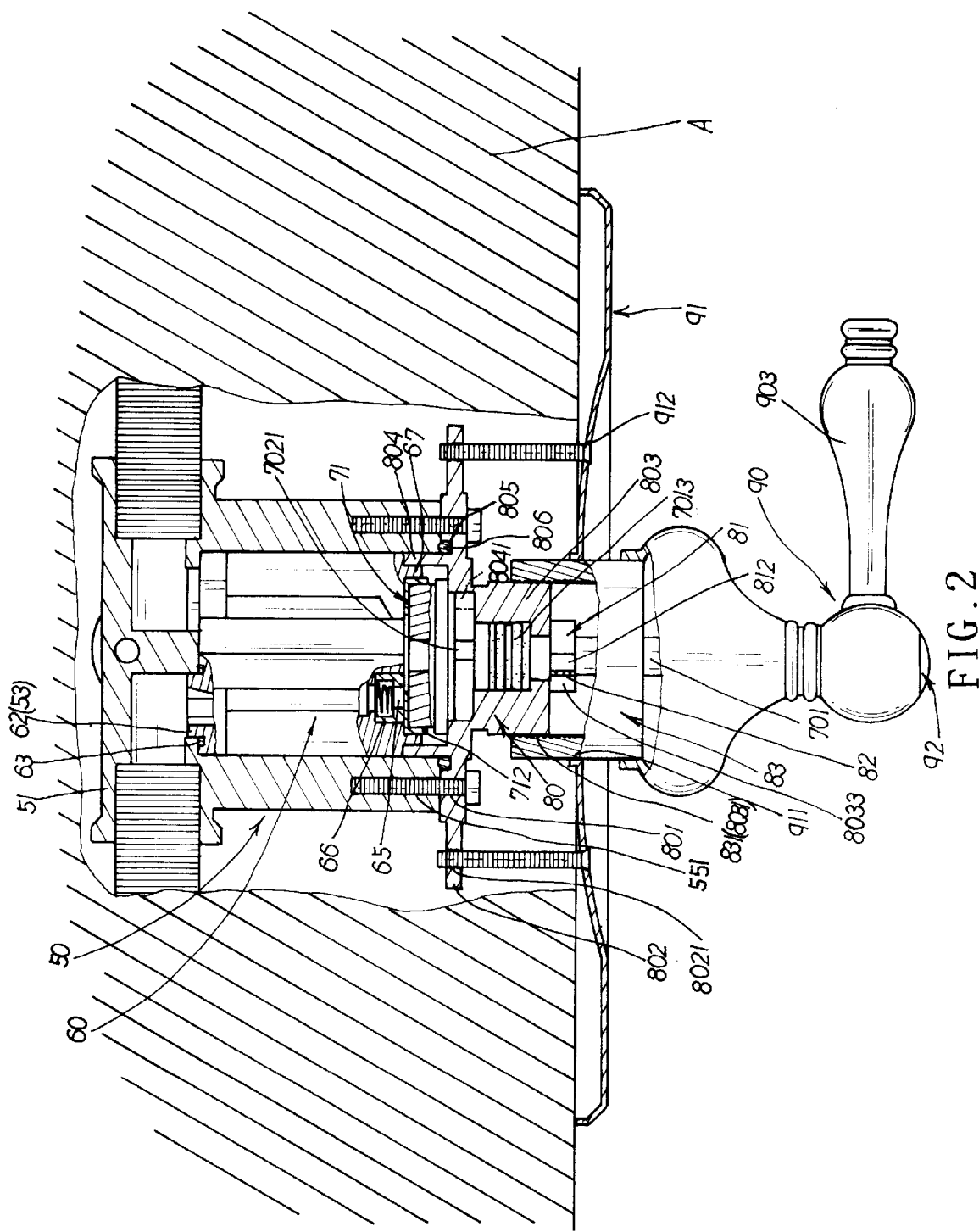
FIG. 2 is a sectional assembled view of the present invention in one state.
Figure 3:
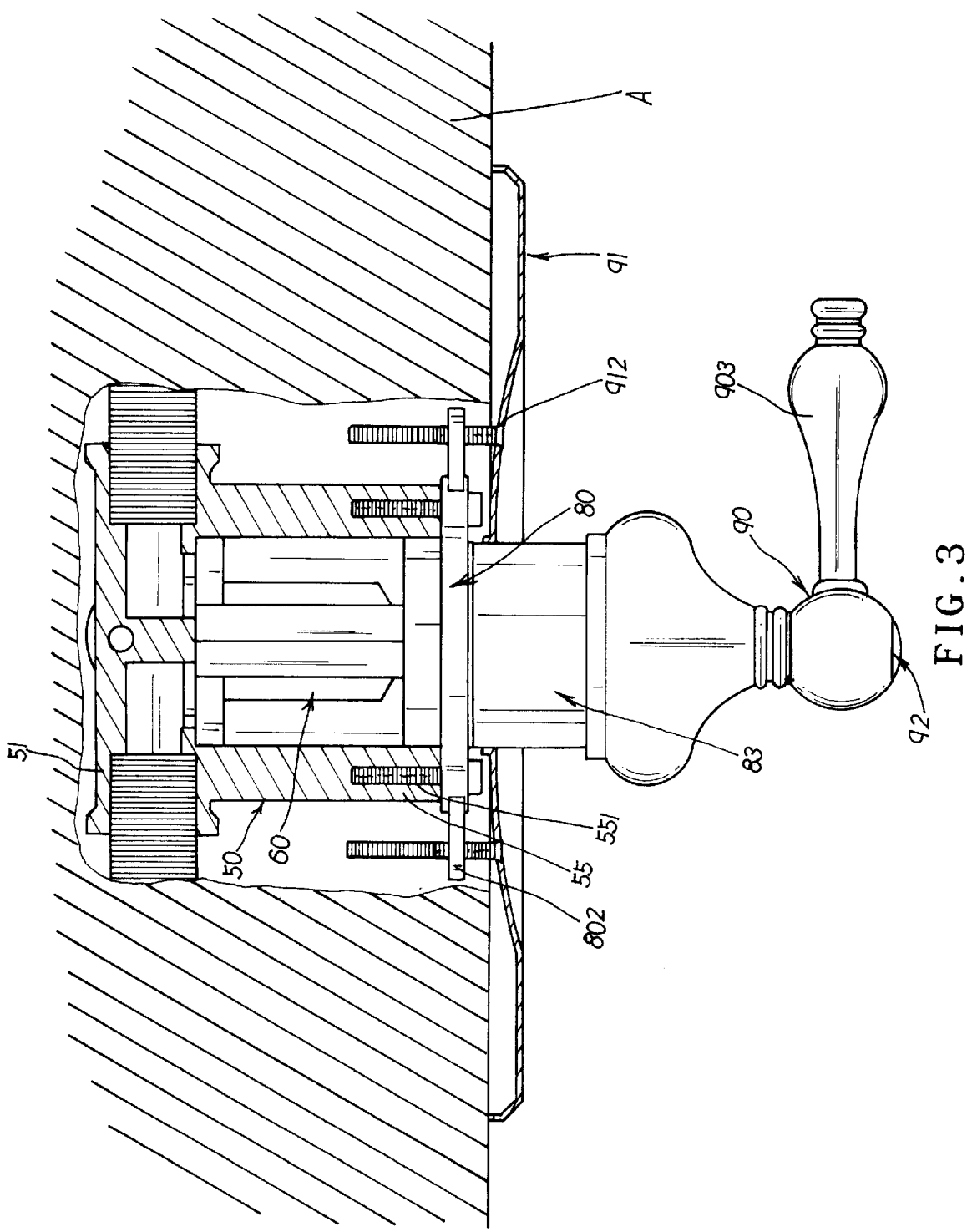
FIG. 3 is a sectional assembled view of the present invention in another state.
Figure 4A:
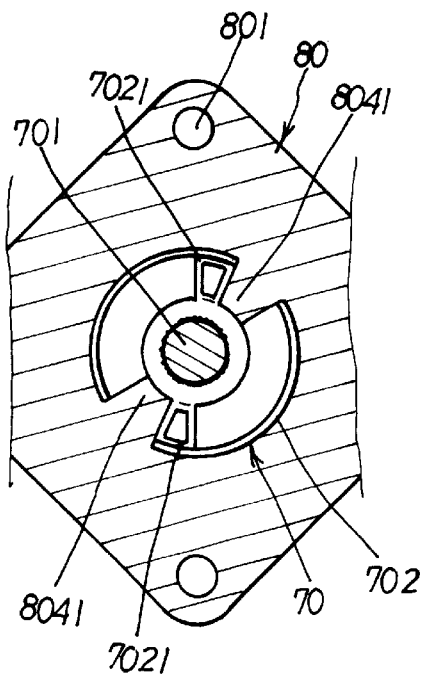
FIGS. 4A to 4D are sectional views showing the states of shut off and greatest amount of discharged hot water of the present invention.
Figure 4B:
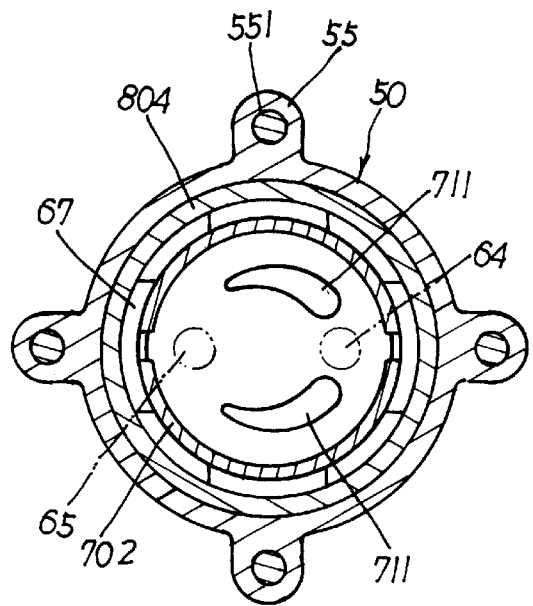
Figure 4C:
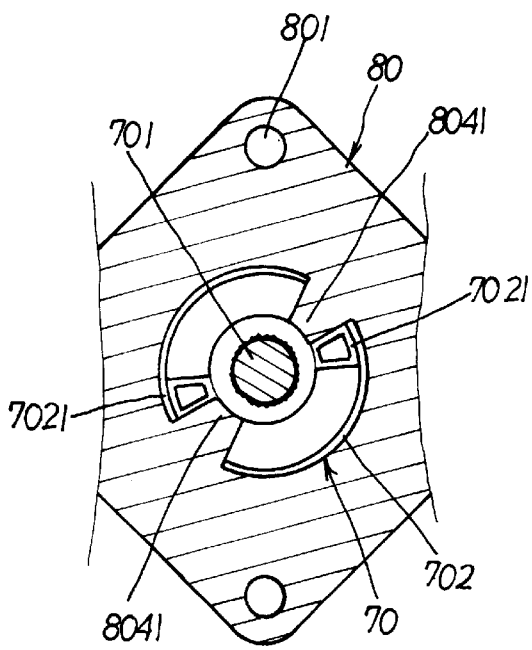
Figure 4D:
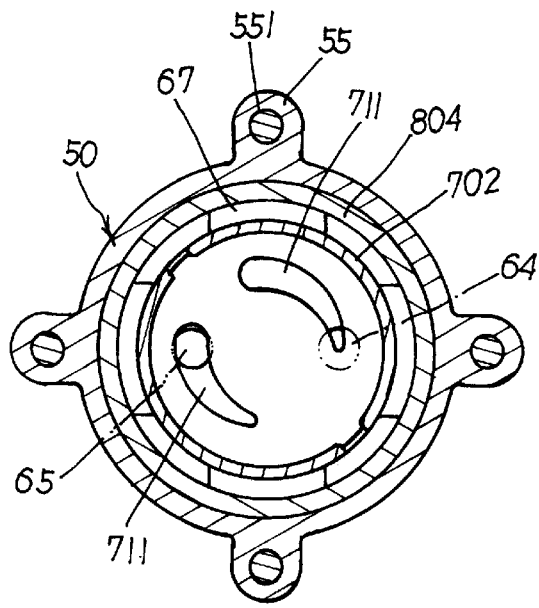

Referring to FIG. 2, when assembled, the balancer 60 is fitted into the faucet body 50 with the cold water inlet column 61 and hot water inlet column 62 respectively inserted into the cold water inlet 52 and hot water inlet 53 of the faucet body 50. The water sealing rings 63 abut against the outer peripheries of the cold and hot water inlets 52, 53 so as to locate the balancer 60 without displacement and ensure the no leakage will take place at the adjoining portion between the balancer 60 and the faucet body 50. The top ends of the arch projecting walls 67 of the balancer 60 are slightly lower than the end edge of the faucet body 50 and the arch projecting walls 67 together with the inner edge face of the faucet body 50 define an annular groove with a certain gap. Then the water inlet plate 71 is attached to the rear end face of the chamber 702 of the controlling valve 70 with the latch legs 712 latched in the notches 7023 thereof. Then the valve stem 701 is forward passed through the central through hole 8023 of the large locking column 803 of the cover member 80 with the two water sealing rings 7013 of the valve stem 701 fitted in the small diameter step of rear end of the cover member 80. The front and middle sections of the valve stem 701 extend out of the front end of the large locking column 803. The restricting blocks 7021 of the controlling valve 70 are interlacedly positioned between the two projecting blocks 8041 of the cover member 80, whereby the valve stem 701 of the controlling valve can be rotated within 0 degree to 135 degrees to accurately adjust the necessary water temperature. The open end of the faucet body 50 is covered by the cover member 80 with the annular flange 804 of the cover member 80 fitted in the annular groove defined by the arch projecting walls 67 and the inner edge face of the faucet body 50 and slightly higher than the open end edge of the faucet body 50. Screws are respectively passed through the through holes 801 of the cover member 80 and screwed into the thread holes 551 of the locking columns 55 of the faucet body 50. The water sealing ring 806 inserted in the annular groove 805 of the cover member 80 abuts against the open end edge of the faucet body 50 and the annular flange 804 abuts against the balancer 60 to abut against the water sealing rings 63 of the cold and hot water inlet columns 61, 62 around the cold and hot water inlets 52, 53. so as to ensure that no leakage will take place at the adjoining portions between the cover member 80 and the faucet body 50 and the balancer 60 and the faucet body 50. The fitting section 7011 of the valve stem 701 is fitted into the fitting hole 811 of the temperature setting sleeve 81 by a suitable angle with the restricting ribs of the fitting hole 811 engaged with the restricting ribs of the fitting section 7011, whereby the rotation of the temperature setting sleeve 81 is limited. The adjustment bolt 82 is screwed through the thread hole 8121 of the temperature setting projection 812 to abut against the engaging block 8033 of the cover member 80 so as to define the end of the travel of the temperature setting sleeve 81. The thread sleeve 83 is screwed onto the outer thread 8031 of the large locking column 803 and can be advanced or moved backward therealong. The faucet body 50 is mounted in a previously drilled cavity of the wall A. At this time, the pipe line 51 on the upper side of the faucet body 50 is connected with the shower head hose, the pipe line 51 on the lower side is connected with the spout, the pipe line 51 on the left side is connected with the hot water pipe line, while the pipe line 51 on the right side is connected with the cold water pipe line. The large decorative cap 91 is fitted on the face of the cavity of the wall to shade the same with the thread sleeve 83 extending out of the central hole 911 of the large decorative cap 91. In the case that the cavity of the wall A is too deep and the handle knob 90 is fitted with the valve stem 701 to get close to the wall A, the thread sleeve 83 is screwed along the locking column 803 inward to the cavity so as to shade the exposed clearance between the handle knob 90 and the large decorative cap 91 and retain and balance the handle knob 90. Reversely, in the case that cavity of the wall A is insufficiently deep (referring to FIG. 3), the thread sleeve 83 is screwed along the large locking column 803 of the cover member 80 outward from the cavity and the screws are passed through the through holes 912 of the large decorative cap 91 and screwed into the thread holes 8021 of the locking plates 802 of the cover member 80. The fitting column 902 of the handle knob 90 is fitted with the fitting section 7012 of the valve stem 701 with the restricting ribs of the fitting column 902 of the handle knob 90 engaged with the restricting ribs of the fitting section 7012 of the valve stem 701. A screw is passed through the stepped hole 901 of the head section of the handle knob 90 with the head of the screw abutting against the step of the stepped hole 901 and secured in the thread hole 7014 of the valve column 701. The hollow thread column 921 of the small decorative cap 92 is screwed into the inner thread 9011 of the stepped hole 901 of the handle knob 90 to complete the assembly.

Referring to FIGS. 4A to 4D, when not used, the handle 903 of the handle knob 90 is clockwise rotated to the dead end, making the two restricting blocks 7021 of the controlling valve 70 are engaged with the two projecting blocks 8041 of the cover member 80. At this time, the two water inlets 711 of the water inlet plate 71 are totally not aligned with the cold and hot water outlets 64, 65 of the balancer 60 so that the water is shut off. On the other hand, when it is desired to obtain greatest amount of discharged hot water, the handle 903 is counterclockwise rotated to the dead end (through 135 degrees), making the restricting blocks 7021 of the controlling valve 70 reversely engaged with the projecting blocks 8041 of the cover member 80. At this time, the large diameter section of one water inlet 711 of the water inlet plate 71 is totally aligned with the hot water outlet 65 of the balancer, while a part of the small diameter section of the other water inlet 711 is aligned with the cold water outlet 64 of the balancer 60 so as to obtain greatest amount of discharged hot water.

According to the above arrangement, the present invention has the following advantages:

1. The cold water inlet column 61 and hot water inlet column 62 of the balancer 60 are respectively inserted into the cold water inlet 52 and hot water inlet 53 of the faucet body 50, whereby the balancer 60 is located and prevented from being displaced so as to avoid leakage and disalignment.

2. The water sealing ring inserted in the annular groove 805 of the cover member 80 can reliably abut against the open end edge of the faucet body 50 and the annular flange can abut against the balancer 60 to further abut against the water sealing rings 63 of the cold and hot water inlet columns 61, 62 around the cold and hot water inlets 52, 53. Therefore, the adjoining portions are forcedly sealed to achieve a good leakproof effect.

3. The handle 903 can be rotated within 0 degree to 135 degrees to accurately adjust the necessary water temperature so as to avoid the problem that the angle range can be hardly controlled.

4. In the case that the cavity of the wall A is too deep or insufficiently deep, the thread sleeve 83 can be screwed into or out of the cavity to a certain extent so as to shade the exposed clearance between the handle knob 90 and the large decorative cap 91 and achieve a good appearance of the faucet body as well as retain and balance the handle knob.

The above embodiment is only an example of the present invention and the scope of the present invention should not be limited to the example. Any modification or variation derived from the example should fall within the scope of the present invention.

What is claimed is:

1. A wall type combination faucet structure comprising a faucet body, a balancer, a controlling valve, a water inlet plate, a cover member, a temperature setting sleeve, an adjustment bolt, a thread sleeve, a handle knob, a large decorative cap and a small decorative cap, an upper, lower, left and right sides of rear end of the faucet body being respectively disposed with four pipe lines, a bottom of the interior of the faucet body being disposed with a small diameter cold water inlet and a large diameter hot water inlet, a water outlet being disposed on lower side between the cold and hot water inlets, a front end of the balancer being disposed with a cold water outlet and a hot water outlet, a water sealing pad being disposed on outer periphery of each of the cold and hot water outlet, a middle section of the valve stem of the controlling valve being disposed a fitting section formed with multiple axial restricting ribs, a temperature setting projection extending from the periphery of the temperature setting sleeve, the temperature setting projection being formed with a thread hole on lateral side, a head section of the handle knob being formed with a stepped hole, a front section of a large diameter step of the stepped hole being formed with inner thread and a handle extending from lateral side of the head section, the large decorative cap being formed with a central hole and two through holes on two sides thereof, the small decorative cap being disposed with a hollow thread rod extending from rear end thereof, said combination faucet structure being characterized in that:

an upper, lower, left and right sides of the faucet body are respectively disposed with four locking columns each of which is formed with a thread hole;

the balancer has a cross-like pattern, the rear end thereof being disposed with a small diameter cold water inlet column and a large diameter hot water inlet column each having an annular groove along outer periphery in which a water sealing ring is inserted, four sides of the front end near the edges of the balancer being respectively disposed with four arch projecting walls;

a front section of the valve stem of the controlling valve is disposed with a fitting section formed with multiple axial restricting ribs, a pair of water sealing rings being fitted around the rear section of the valve stem, a head section of the valve stem being disposed with a thread socket, a rear end of the valve stem being connected with a cold/hot combination chamber a top face of which is disposed with two opposite restricting blocks, two opposite slots being formed on the periphery of the chamber, two opposite notches being formed on rear end of the valve stem;

an end face of the water inlet plate being disposed with two opposite banana-shaped water inlets, a periphery of the water inlet plate being disposed with two opposite latch legs;

an upper, lower, left and right ends of the cover member are respectively disposed four through holes, a left and right ends of the cover member being respectively disposed with two locking plates each of which is formed with a thread hole, a front end of the cover member being disposed with a large locking column formed with outer thread and a central hole, an annular flange being disposed on rear end of the cover member and an annular groove being disposed along the outer periphery of the flange, a water sealing ring being fitted in the annular groove, a large, a middle and a small diameter stepped socket being disposed in the flange, two opposite projecting blocks being disposed on the face of the middle diameter step;

the temperature setting sleeve is formed with a central fitting hole the inner wall of which is formed with multiple restricting ribs;

the thread sleeve has two open ends and the inner diameter thereof is substantially equal to that of the large locking column of the cover member, the thread sleeve being formed with inner thread; and a rear end of the handle knob is disposed with a fitting column the inner wall of which is formed with multiple restricting ribs, whereby the cold water inlet column and hot water inlet column of the balancer are respectively inserted into the cold water inlet and hot water inlet of the faucet body so as to locate the balancer without displacement and ensure the no leakage will take place at the adjoining portion between the balancer and the faucet body, the valve stem being forward passed through the central through hole of the large locking column of the cover member, the restricting blocks of the controlling valve being interlacedly positioned between the two projecting blocks of the cover member, whereby the valve stem of the controlling valve can be rotated between the projecting blocks of the cover member within 0 degree to 135 degrees to accurately adjust the necessary water temperature, the open end of the faucet body being covered by the cover member with the annular flange of the cover member fitted in the annular groove defined by the arch projecting walls and the inner edge face of the faucet body and slightly higher than the open end edge of the faucet body, screws being respectively passed through the through holes of the cover member and screwed into the thread holes of the locking columns of the faucet body, the water sealing ring inserted in the annular groove of the cover member abutting against the open end edge of the faucet body and the annular flange abutting against the balancer to abut against the water sealing rings of the cold and hot water inlet columns around the cold and hot water inlets so as to ensure that no leakage will take place at the adjoining portions between the cover member and the faucet body and the balancer and the faucet body, in the case that the cavity of the wall is too deep or insufficiently deep, the thread sleeve being screwed along the locking column into or out of the cavity so as to retain and balance the handle knob.

* * * * *